United States Patent
Perincherry et al.

(10) Patent No.: US 11,321,587 B2
(45) Date of Patent: May 3, 2022

(54) DOMAIN GENERATION VIA LEARNED PARTIAL DOMAIN TRANSLATIONS

(71) Applicant: Ford Global Technologies, LLC, Dearborn, MI (US)

(72) Inventors: Akhil Perincherry, Mountain View, CA (US); Christopher Cruise, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 170 days.

(21) Appl. No.: 16/777,017

(22) Filed: Jan. 30, 2020

(65) Prior Publication Data

US 2021/0241030 A1   Aug. 5, 2021

(51) Int. Cl.
*G06K 9/62* (2006.01)
*G06K 9/00* (2022.01)
*G06N 3/04* (2006.01)
*G06N 3/08* (2006.01)

(52) U.S. Cl.
CPC ....... *G06K 9/6256* (2013.01); *G06K 9/00798* (2013.01); *G06N 3/04* (2013.01); *G06N 3/08* (2013.01)

(58) Field of Classification Search
CPC .... G06K 9/6256; G06K 9/00798; G06N 3/04; G06N 3/08
USPC ...................................................... 382/157
See application file for complete search history.

(56) References Cited

U.S. PATENT DOCUMENTS

| | | | |
|---|---|---|---|
| 8,856,050 B2 | 10/2014 | Chenthamarakshan et al. | |
| 10,289,909 B2 | 5/2019 | Baradei et al. | |
| 2018/0330183 A1* | 11/2018 | Tsunoda | G06K 9/46 |
| 2019/0034483 A1* | 1/2019 | Millius | G06F 16/335 |
| 2019/0130221 A1* | 5/2019 | Bose | G06K 9/6267 |
| 2019/0265712 A1* | 8/2019 | Satzoda | B60W 40/09 |

FOREIGN PATENT DOCUMENTS

CN    108898218 A    11/2018

OTHER PUBLICATIONS

Venkateswara, H., et al., "Deep Hashing Network for Unsupervised Domain Adaptation," Center for Cognitive Ubiquitous Computing, Arizona State University, Tempe, AZ, Jun. 22, 2017, 15 pages.

(Continued)

*Primary Examiner* — Juan A Torres
(74) *Attorney, Agent, or Firm* — Brandon Hicks; Bejin Bieneman PLC

(57) ABSTRACT

A system and a method can receive a first dataset having a first label and a first context. The system and the method can also generate, at the trained deep neural network, a second dataset having the first label and a second context according to a mapping, wherein a first mapping of the plurality of mapping comprises one or more weights of the trained deep neural network that maps data having the first label and the first context to data having a second label and the first context and a second mapping of the plurality of mapping comprises one or more weights of the trained deep neural network that maps data having a second label and the first context to data having the second label and the second context, wherein the second context is different from the first context and the second label is different from the first label.

20 Claims, 6 Drawing Sheets

(56) References Cited

OTHER PUBLICATIONS

Lu, J., et al., "Transfer Learning using Computational Intelligence: A Survey," Decision Systems & e-Service Intelligence (DeSI) Lab, Centre for Quantum Computation & Intelligent Systems (QCIS), Faculty of Engineering and Infomnation Technology,University of Technology Sydney, 2015, 19 pages.

* cited by examiner

DOMAIN GENERATION VIA LEARNED PARTIAL DOMAIN TRANSLATIONS

BACKGROUND

Deep neural networks (DNNs) can be used to perform many image understanding tasks, including classification, segmentation, and captioning. Typically, DNNs require large amounts of training images (tens of thousands to millions). Additionally, these training images typically need to be annotated for the purposes of training and prediction.

DETAILED DESCRIPTION

Figure 1:
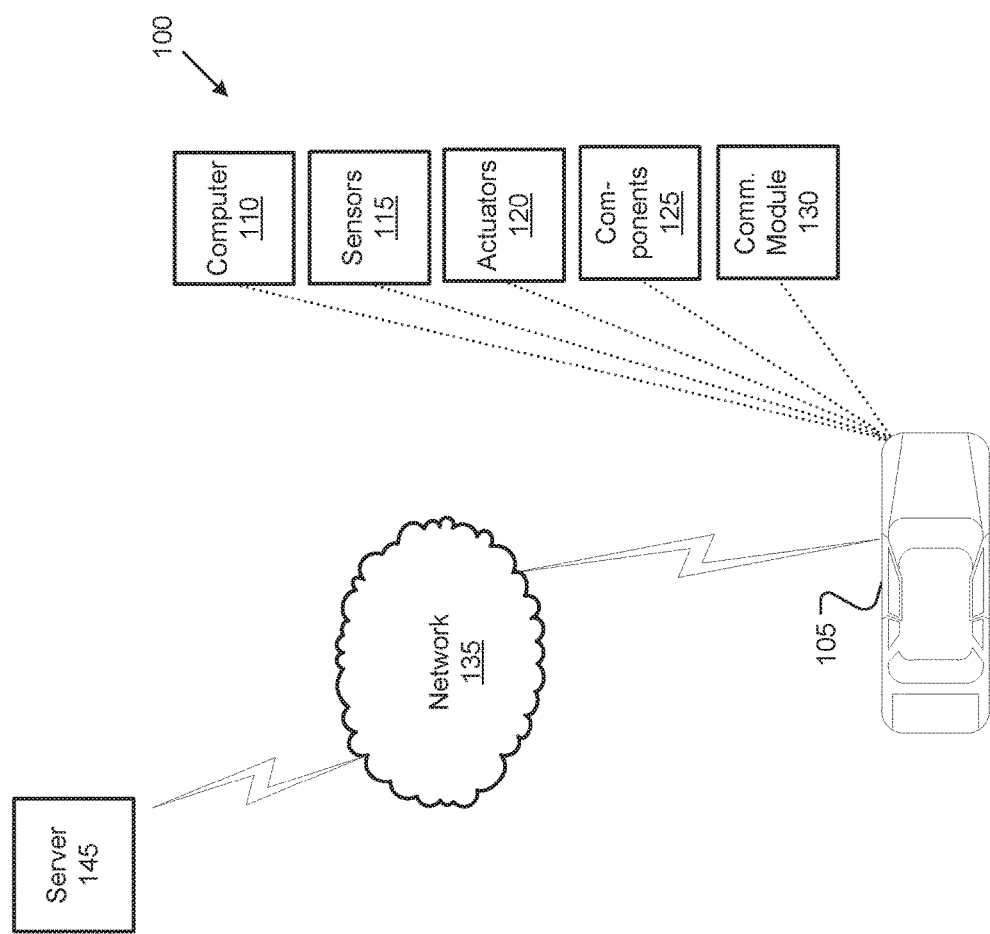
FIG. 1 is a diagram of an example system for training an adversarial network.

A system comprises a computer including a processor and a memory, and the memory including instructions such that the processor is programmed to receive, at a trained deep neural network, a first dataset having a first label and a first context; and generate, at the trained deep neural network, a second dataset having the first label and a second context according to a mapping, wherein a first mapping of the plurality of mapping comprises one or more weights of the trained deep neural network that maps data having the first label and the first context to data having a second label and the first context and a second mapping of the plurality of mapping comprises one or more weights of the trained deep neural network that maps data having a second label and the first context to data having the second label and the second context, wherein the second context is different from the first context and the second label is different from the first label.

In other features, the trained deep neural network comprises a generator trained within an adversarial neural network.

In other features, the first dataset and the second dataset each comprise a plurality of image frames.

In other features, the plurality of image frames corresponding to the first dataset comprise image frames captured by at least one of a forward-looking camera or a backward-looking camera.

In other features, the plurality of image frames corresponding to the second dataset comprise generated image frames represented as being captured by the other of the forward-looking camera or the backward-looking camera.

In other features, the first label corresponds to a forward-looking camera perspective and the second label corresponds to a backward-looking camera perspective.

In other features, the first context corresponds to an illuminated environment and the second context corresponds to a non-illuminated environment.

A system comprises a computer including a processor and a memory, and the memory including instructions such that the processor is programmed to receive, at a trained deep neural network, a first image having a first label representing a perspective of the first image and a first context representing an environment of the first image; and generate, via a mapping of the trained deep neural network, a second image having the first label and a second context representing an environment of the second image, wherein a first mapping of the plurality of mapping comprises one or more weights of the trained deep neural network that maps data having the first label and the first context to data having a second label and the first context and a second mapping of the plurality of mapping comprises one or more weights of the trained deep neural network that maps data having a second label and the first context to data having the second label and the second context, wherein the second context is different from the first context and the second label is different from the first label.

In other features, the trained deep neural network comprises a generator trained within an adversarial neural network.

In other features, the second image comprises a generated image having at least one of a forward-looking camera or a backward-looking camera perspective.

In other features, the first context corresponds to an illuminated environment and the second context corresponds to a non-illuminated environment.

In other features, the first context comprises at least one of a presence or an absence of a lane.

A method comprises receiving, at a trained deep neural network, a first dataset having a first label and a first context; and generating, at the trained deep neural network, a second dataset having the first label and a second context according to a mapping, wherein a first mapping of the plurality of mapping comprises one or more weights of the trained deep neural network that maps data having the first label and the first context to data having a second label and the first context and a second mapping of the plurality of mapping comprises one or more weights of the trained deep neural network that maps data having a second label and the first context to data having the second label and the second context, wherein the second context is different from the first context and the second label is different from the first label.

In other features, the trained deep neural network comprises a generator trained within an adversarial neural network.

In other features, the first dataset and the second dataset each comprise a plurality of image frames.

In other features, the plurality of image frames corresponding to the first dataset comprise image frames captured by at least one of a forward-looking camera or a backward-looking camera.

In other features, the plurality of image frames corresponding to the second dataset comprise generated image frames represented as being captured by the other of the forward-looking camera or the backward-looking camera.

In other features, the first label corresponds to a forward-looking camera perspective and the second label corresponds to a backward-looking camera perspective.

In other features, the first context corresponds to an illuminated environment and the second context corresponds to a non-illuminated environment.

In other features, the first context comprises at least one of a presence or an absence of a lane.

Domain adaptation is directed to generalizing a model from source domain to a target domain. Typically, the source domain has a large amount of training data while data in the target domain can be scarce. For instance, the availability of back-up camera lane data can be constrained due to camera-supplier constraints, rewiring problems, lack of relevant applications, and the like. However, there may be a number of datasets that include forward looking camera images that include lanes.

As described herein, a deep neural network can be used to learn a mapping between domains and a partial mapping can be used to increase the available data for training in the target domain. A partial mapping may comprise an incomplete cycle of mappings. For example, a neural network can be used to learn a mapping between a source domain and a target domain. In some instances, a desired dataset within the target domain may be unavailable. In these instances, the neural network can use partial mapping to generate data within the target domain as described in greater detail herein.

While the present disclosure describes a vehicle system and a server, it is understood that any suitable computer system may be used to perform the techniques and/or the functionality of the adversarial neural network described herein.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
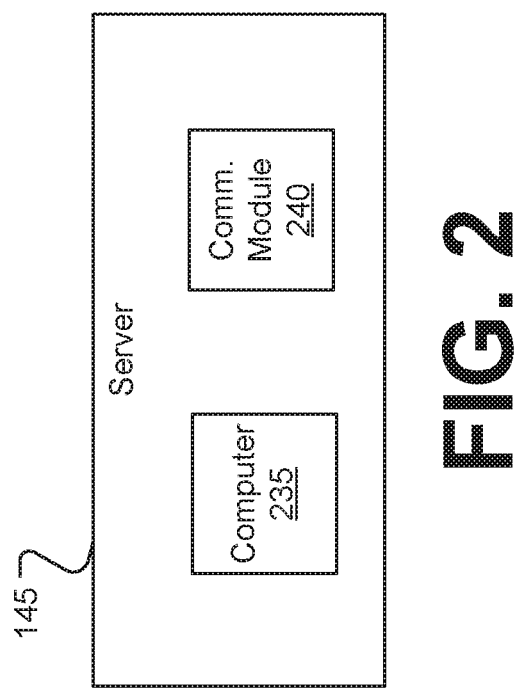
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
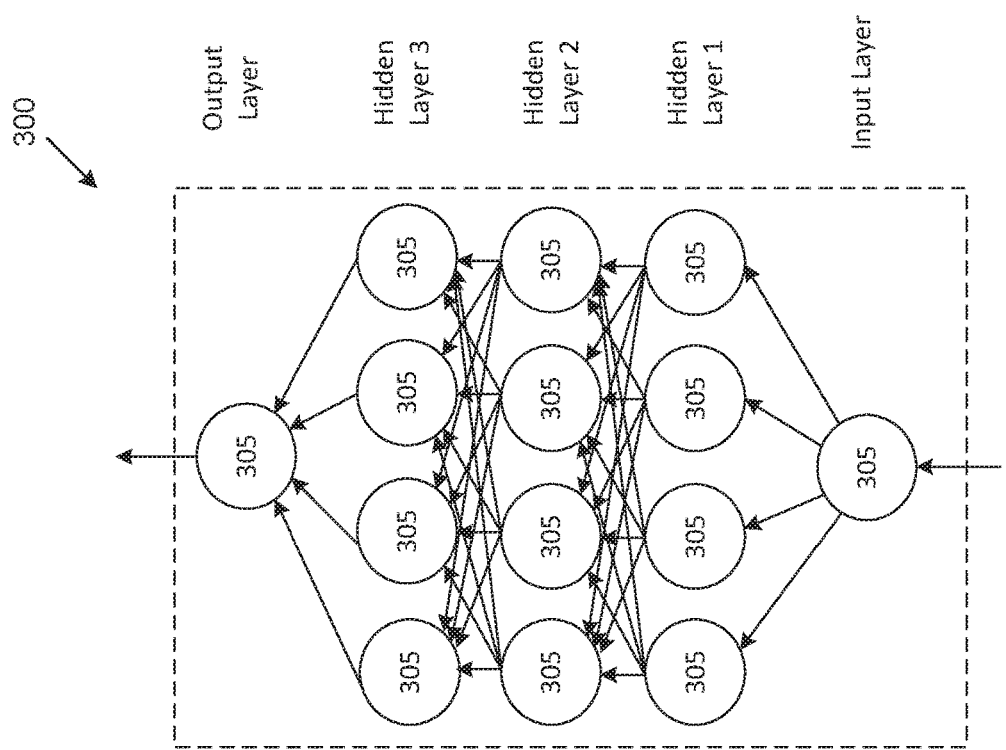
FIG. 3 is a diagram of an example deep neural network.

FIG. 3 is a diagram of an example deep neural network (DNN) 300 that may be used herein. The DNN 300 includes multiple nodes 305, and the nodes 305 are arranged so that the DNN 300 includes an input layer, one or more hidden layers, and an output layer. Each layer of the DNN 300 can include a plurality of nodes 305. While FIG. 3 illustrates three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept data as input and generate an output based on the input. The DNN 300 can be trained with ground truth data, i.e., data about a real-world condition or state. For example, the DNN 300 can be trained with ground truth data or updated with additional data by a processor. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing objects and object labels.

Figure 4:
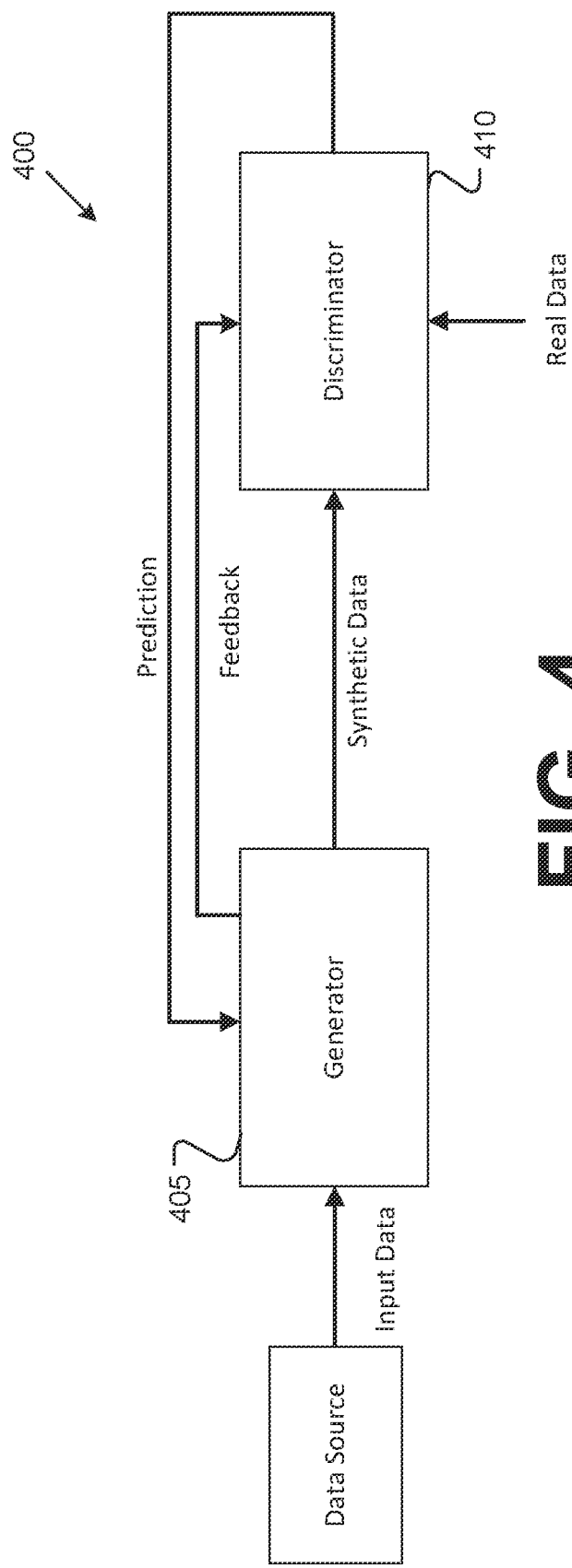
FIG. 4 is a diagram of an example adversarial network.

FIG. 4 is a diagram of an example adversarial neural network 400 used to generate data based on generally related datasets. While the present disclosure describes an adversarial neural network, it is understood that the other deep neural networks may be used to generate data based on generally related datasets. The adversarial neural network 400 can be a software program that can be loaded in memory and executed by a processor in the vehicle 105 and/or the server 145, for example. As shown, the adversarial neural network 400 includes a generator 405 and a discriminator 410. The generator 405 and/or the discriminator 410 may comprise a DNN 300. Within the present context, the generator 405 and the discriminator 410 comprise a generative adversarial network (GAN). The GAN is a deep neural network that employs a class of artificial intelligence algorithms used in machine learning and implemented by a system of two neural networks contesting each other in an adversarial zero-sum game framework.

In an example implementation, the generator 405 receives input data, which is described in greater detail below. The input data may comprise natural language, images, or the like. The generator 405 generates synthetic data based on the received input data. For example, if the input data is an image, the synthetic image may be an image-to-image translation of the image, e.g., the input image is translated from one domain (nighttime) to another domain (daytime).

The discriminator 410 is configured to receive data, evaluate the received data, and generate a prediction indicative of whether the received image is machine-generated by the generator 405 or is sourced from a real data distribution. The discriminator 410 receives synthetic data generated by the generator 405 and data from a real data distribution during training such that the discriminator 410 can distinguish between synthetic data and data from a real data distribution. In one or more implementations, the discriminator 410 may comprise a convolutional neural network. However, it is understood that other neural networks may be used in accordance with the present disclosure.

The training of the generator 405 may use reinforcement learning to train the generative model. Reinforcement learning is a type of dynamic programming that trains algorithms using a system of reward and punishment. A reinforcement learning algorithm, or reinforcement learning agent, learns by interacting with its environment. The agent receives rewards by performing correctly and penalties for performing incorrectly. For instance, the reinforcement learning agent learns without intervention from a human by maximizing the reward and minimizing the penalty. In some instances, As shown in FIG. 4, a prediction generated by the discriminator 410 is provided to the generator 405. The generator 405 can use the prediction to modify, i.e., update, one or more weights of the generator 405 to minimize the predictions indicating synthetic data is classified as synthetic, i.e., fake. For example, the generator 405 may update one or more weights within the generator 405 using back-propagation, or the like.

The discriminator 410 can also be updated based on the prediction. For example, if the prediction indicates the generated synthetic data is from a real data distribution, the discriminator 410 may receive feedback indicating the data is synthetic data. Based on the feedback, one or more weights of the discriminator 410 can be updated to minimize incorrect predictions. Through the training process, the generator 405 can improve the quality of synthetic data generated, e.g., generate more realistic synthetic data, and the discriminator 410 can improve identification of nuances and characteristics of synthetically generated data.

Within the present disclosure, the DNN(s) 300, such as the adversarial neural network 400, can be trained with datasets having a set of different labels of the same context to generate, e.g., learn, a mapping. As used herein, generating, e.g., learning, mappings corresponds to the updated weights within the one or more DNN(s) 300 as a result of training the DNN(s) 300. Additionally, labels may refer to a data perspective, e.g., image perspective, and context may refer to an environment, e.g., illuminated or non-illuminated, in which the data represents.

Figures 5, 6:
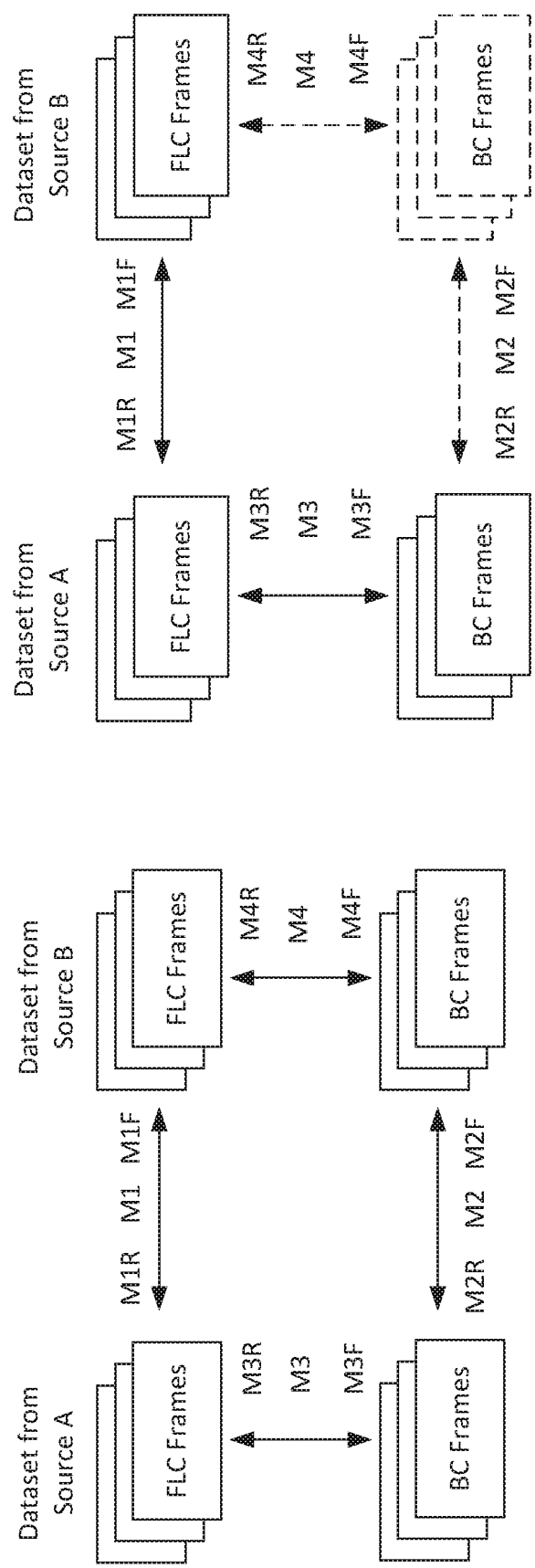
FIGS. 5 and 6 are diagrams of example datasets and mappings between the various datasets.

FIG. 5 illustrates example datasets and mappings M1, M2, M3, and M4 between the datasets. As shown, the dataset from source A includes respective forward-looking camera (FLC) frames and respective backup-camera (BC) frames, and the dataset from source B includes respective FLC frames and respective BC frames. For example, FLC frames comprise a first label and BC frames comprise a second label.

The sources A and B may represent context, or an environment corresponding to the data, such as images captured within an illuminated environment, e.g., day conditions (D), or images captured within a non-illuminated environment, e.g., night conditions (N). The context may also comprise a presence or an absence of a lane. Thus, using these contexts can create four unique situations—FLC-N, FLC-D, BC-N and BC-D. If a particular dataset is missing, such as BC-D, the DNN(s) 300 can learn the representation to map FLC-N to FLC-D and apply that to map from BC-N to BC-D. Equivalently, the DNN(s) 300 can learn to map FLC-N to BC-N and apply that to map FLC-D to BC-D.

The mappings M1, M2, M3, and M4 can be generated during training of the DNN(s) 300. As shown, the mappings are denoted using arrowheads and the letters "R" and "F." In one example, a FLC frame from source A can be provided to the trained DNN(s) 300 such that the DNN(s) 300 can generate a synthetic image corresponding to a BC frame corresponding to source B. The DNN(s) 300 can use the mappings M1F and M4F or mappings M3F and M2F in a cyclical manner to generate the BC frame. In another example, a FLC frame from source B can be used to generate a FLC frame corresponding to source A using mapping M1R or mapping M4F, M2R, and M3R.

As shown in FIG. 6, a dataset from a particular source may not be available. In this example, the BC frames from source B are not available. Thus, mappings corresponding to M2 and M4 are not available. In this instance, the DNN(s) 300 are configured to use the partial mapping M1 in place of M2 and to use the mapping M3 in place of M4. Thus, during training, the DNN(s) 300 are configured to learn mappings using data having different labels of the same context and/or learn mappings using data having different contexts of the same label. The learnt mappings can be used to generate synthetic data having the same label but a different context, or vice versa. For example, the DNN(s) 300 learns the mapping between data having a set of different labels of the same context, and the DNN(s) 300 applies that mapping to generate, e.g., convert, data having the same labels to a desired context.

In one or more implementations, the DNN(s) 300 may be initially trained to obtain a plurality of mappings separately, such as obtaining M1 and M3 separately. The DNN(s) 300 may then be trained to obtain M1 and M3 jointly. The mappings for M2 and M4 may then be initialized based on M1 and M3.

In some implementations, the DNN(s) 300 may incorporate a loss within its cost function based on a reconstructed dataset. For example, referring back to FIG. 6, a FLC frame from source A may be constructed using a BC frame from source A using mapping M3R. The reconstructed FLC frame can be compared to the ground truth FLC frame, and the loss based on the comparison can be incorporated into the cost function of the DNN(s) 300.

Figure 7:
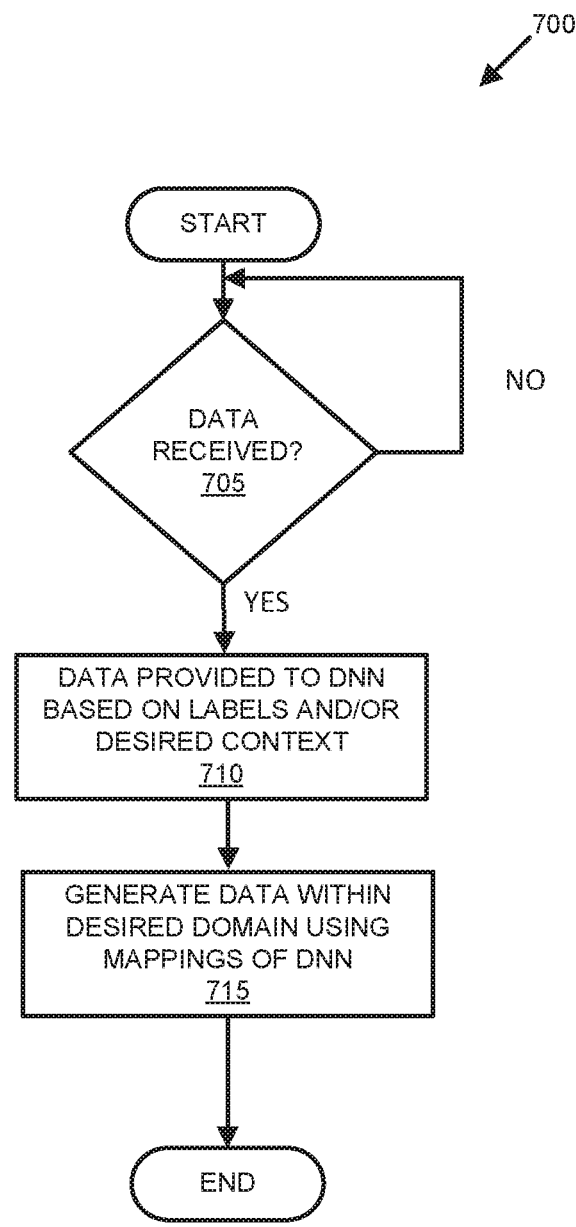
FIG. 7 is a flow diagram illustrating an example process for generating a dataset based on a mapping generated by a deep neural network.

FIG. 7 is a flowchart of an exemplary process 700 for generating data within a different domain. For example, a trained DNN 300, such as a trained generator 405, generates a dataset having a first label and a second context. The trained DNN 400 uses previously learnt mappings that map data having a first label and a first context to data having a second label and the second context.

Blocks of the process 700 can be executed by the computer 110 or the computer 235. The process 700 begins at block 705 in which a determination of whether data having a first label has been received. If no data is received, the process 700 returns to block 705. Otherwise, the data is provided to one or more DNNs 300 based on the first label and/or the desired context at block 710. The desired context refers to the data domain for which the DNN(s) 300 is to generate data within. The computers 110 or 235 provide data to the DNN 300 having been trained to generate data within the desired domain. At block 715, the DNN 300 generates data within the desired domain, e.g., context, based on the mapping. As discussed above, the mapping may not be available to generate data within the desired domain, e.g., context, because there is limited/no data in that context.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive, at a trained deep neural network, a first dataset having a first label and a first context; and
   generate, at the trained deep neural network, a second dataset having the first label and a second context according to a plurality of mappings,
   wherein a first mapping of the plurality of mapping comprises one or more weights of the trained deep neural network that maps data having the first label and the first context to data having a second label, and
   the first context and a second mapping of the plurality of mapping comprises one or more weights of the trained deep neural network that maps data having the second label and the first context to data having the second label and the second context, wherein the second context is different from the first context and the second label is different from the first label.

2. The system of claim 1, wherein the trained deep neural network comprises a generator trained within an adversarial neural network.

3. The system of claim 1, wherein the first dataset and the second dataset each comprise a plurality of image frames.

4. The system of claim 3, wherein the plurality of image frames corresponding to the first dataset comprise image frames captured by at least one of a forward-looking camera or a backward-looking camera.

5. The system of claim 4, wherein the plurality of image frames corresponding to the second dataset comprise generated image frames represented as being captured by the other of the forward-looking camera or the backward-looking camera.

6. The system of claim 5, wherein the first label corresponds to a forward-looking camera perspective and the second label corresponds to a backward-looking camera perspective.

7. The system of claim 6, wherein the first context corresponds to an illuminated environment and the second context corresponds to a non-illuminated environment.

8. A system comprising a computer including a processor and a memory, the memory including instructions such that the processor is programmed to:

receive, at a trained deep neural network, a first image having a first label representing a perspective of the first image and a first context representing an environment of the first image; and generate, via a plurality of mapping of the trained deep neural network, a second image having the first label and a second context representing an environment of the second image, wherein a first mapping of the plurality of mapping comprises one or more weights of the trained deep neural network that maps data having the first label and the first context to data having a second label, and the first context and a second mapping of the plurality of mapping comprises one or more weights of the trained deep neural network that maps data having the second label and the first context to data having the second label and the second context, wherein the second context is different from the first context and the second label is different from the first label.

9. The system of claim 8, wherein the trained deep neural network comprises a generator trained within an adversarial neural network.

10. The system of claim 8, wherein the second image comprises a generated image having at least one of a forward-looking camera or a backward-looking camera perspective.

11. The system of claim 8, wherein the first context corresponds to an illuminated environment and the second context corresponds to a non-illuminated environment.

12. The system of claim 8, wherein the first context comprises at least one of a presence or an absence of a lane.

13. A method comprising:
receiving, at a trained deep neural network, a first dataset having a first label and a first context; and
generating, at the trained deep neural network, a second dataset having the first label and a second context according to a plurality of mapping, wherein a first mapping of the plurality of mapping comprises one or more weights of the trained deep neural network that maps data having the first label and the first context to data having a second label and the first context, and a second mapping of the plurality of mapping comprises one or more weights of the trained deep neural network that maps data having the second label and the first context to data having the second label and the second context, wherein the second context is different from the first context and the second label is different from the first label.

14. The method of claim 13, wherein the trained deep neural network comprises a generator trained within an adversarial neural network.

15. The method of claim 13, wherein the first dataset and the second dataset each comprise a plurality of image frames.

16. The method of claim 13, wherein the first context comprises at least one of a presence or an absence of a lane.

17. The method of claim 15, wherein the plurality of image frames corresponding to the first dataset comprise image frames captured by at least one of a forward-looking camera or a backward-looking camera.

18. The method of claim 17, wherein the plurality of image frames corresponding to the second dataset comprise generated image frames represented as being captured by the other of the forward-looking camera or the backward-looking camera.

19. The method of claim 18, wherein the first label corresponds to a forward-looking camera perspective and the second label corresponds to a backward-looking camera perspective.

20. The method of claim 19, wherein the first context corresponds to an illuminated environment and the second context corresponds to a non-illuminated environment.

* * * * *